(12) United States Patent
Costa et al.

(10) Patent No.: US 8,123,641 B2
(45) Date of Patent: Feb. 28, 2012

(54) CONTINUOUS VARIABLE TRANSMISSION BELT

(75) Inventors: Giuseppe Costa, Chieti (IT); Sergio Lolli, Ascoli Piceno (IT)

(73) Assignee: Dayco Europe S.R.L. Con Unico Socio, Frazione Scalo (IT)

( * ) Notice: Subject to any disclaimer, the term of this patent is extended or adjusted under 35 U.S.C. 154(b) by 764 days.

(21) Appl. No.: 11/576,664

(22) PCT Filed: Oct. 4, 2005

(86) PCT No.: PCT/EP2005/054988
§ 371 (c)(1),
(2), (4) Date: Oct. 24, 2008

(87) PCT Pub. No.: WO2006/037779
PCT Pub. Date: Apr. 13, 2006

(65) Prior Publication Data
US 2009/0054188 A1    Feb. 26, 2009

(30) Foreign Application Priority Data
Oct. 5, 2004 (IT) .............................. TO2004A0671

(51) Int. Cl.
*F16G 1/21* (2006.01)
(52) U.S. Cl. ...................................... 474/242; 474/201
(58) Field of Classification Search ................ 474/201, 474/204, 205, 242, 244, 245
See application file for complete search history.

(56) References Cited

U.S. PATENT DOCUMENTS

| 4,689,038 A | 8/1987 | Henderson |
| 4,869,705 A * | 9/1989 | Fenton ............................. 474/8 |
| 5,171,189 A * | 12/1992 | Douhairet et al. ............ 474/144 |
| 6,409,620 B1 * | 6/2002 | Yoshida et al. ............... 474/242 |
| 6,592,481 B2 * | 7/2003 | Sato et al. ..................... 474/134 |

FOREIGN PATENT DOCUMENTS

| DE | 100 57 381 | 5/2002 |
| EP | 0 240 912 | 10/1987 |
| EP | 1 258 652 | 11/2002 |
| JP | 10-122306 | 5/1998 |
| JP | 10-159909 | 6/1998 |

* cited by examiner

*Primary Examiner* — Emmanuel M Marcelo
(74) *Attorney, Agent, or Firm* — Fish & Richardson P.C.

(57) ABSTRACT

A continuous variable transmission belt, comprising an annular continuous band comprising a body reinforced by a longitudinal armature and a plurality of friction plugs connected by coupling of shape with at least one of either an outer spine of the continuous band or an inner surface opposite to the outer spine with respect to the armature, the friction plugs comprising respectively a friction member adapted to cooperate with a pulley of the transmission and a connection member cooperating with the friction member to rigidly connect the friction plug to the continuous band. Each of the connecting members is made of a material having a higher thermal conductivity than that of the friction members and presents an abutting surface against either of the outer spine or the inner surface.

8 Claims, 2 Drawing Sheets

CONTINUOUS VARIABLE TRANSMISSION BELT

CROSS-REFERENCES TO RELATED APPLICATIONS

The present patent application is a 371 U.S. National Phase of PCT Application No. PCT/EP2005/054988, filed Oct. 4, 2005, which claims priority of Italy Patent Application TO2004A000671, filed Oct. 5, 2004. Both of the aforementioned applications are hereby incorporated herein by reference in their entireties.

TECHNICAL FIELD

The present invention relates to a continuous variable transmission belt, particularly for motor vehicles.

BACKGROUND ART

Recently there have been developed, for example for the application aboard vehicles such as scooters or small cars, high power continuous variable transmissions comprising a belt having a continuous annular band made of elastomeric material reinforced by a circumferential inner armature and a plurality of plugs connected by coupling of shape with respective shaped portions made along at least one spine of the continuous band.

The transmission further comprises a pair of pulleys, driving and driven respectively, turning on respective axes and each presenting a pair of tapered walls axially mobile and cooperating by friction with the belt plugs.

In operation, the transmission ratio is varied by the reciprocal movement of the tapered surfaces of each pulley and the consequent variation of the curvature radius of the belt around the pulleys.

In this way, the continuous band of the belt undergoes numerous bending cycles, which contribute to increase the temperature of the elastomeric compound forming the continuous band, particularly along an inner spine of the continuous band, which is compression stressed.

An excessive heating of the inner spine causes the progressive deterioration of the elastomeric compound and consequently causes problems of durability and reliability of the continuous variable transmission.

DISCLOSURE OF INVENTION

It is the object of the present invention to achieve a belt for a continuous variable transmission which is simple and cost-effective to make, having high reliability and being free from the aforementioned drawbacks.

According to the present invention, it is made a belt as defined in claim 1.

BRIEF DESCRIPTION OF THE DRAWINGS

For a better understanding of the present invention, there will now be described a preferred embodiment, only by way of non-limitative example, with reference to the accompanying drawings, in which.

BEST MODE FOR CARRYING OUT THE INVENTION

Figure 1:
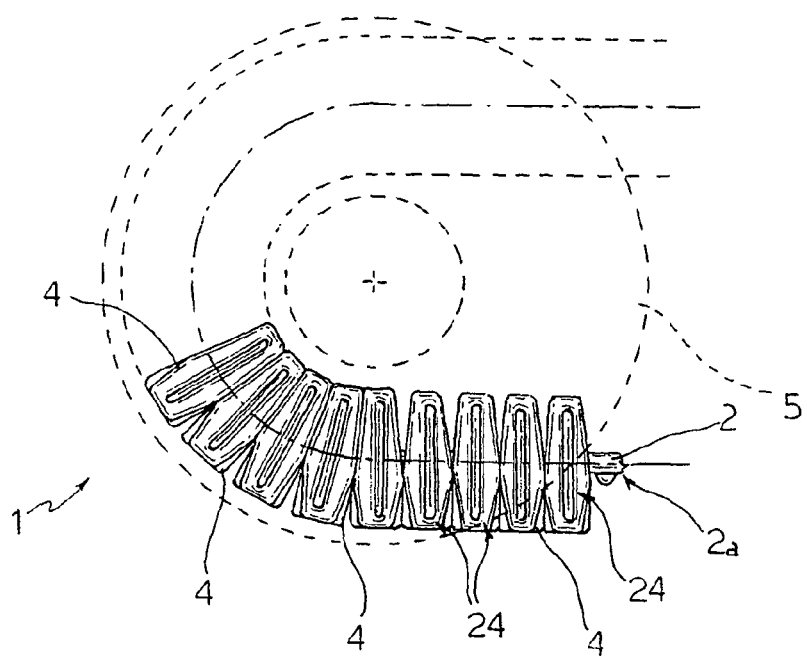
FIG. 1 is a schematic view of a continuous variable transmission comprising a belt according to the present invention.
Figure 2:
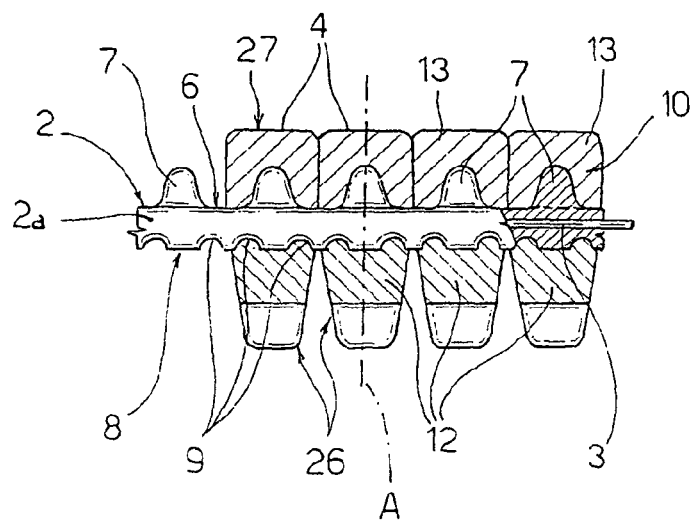
FIG. 2 is a longitudinal section of the belt in FIG. 1.
Figure 3:
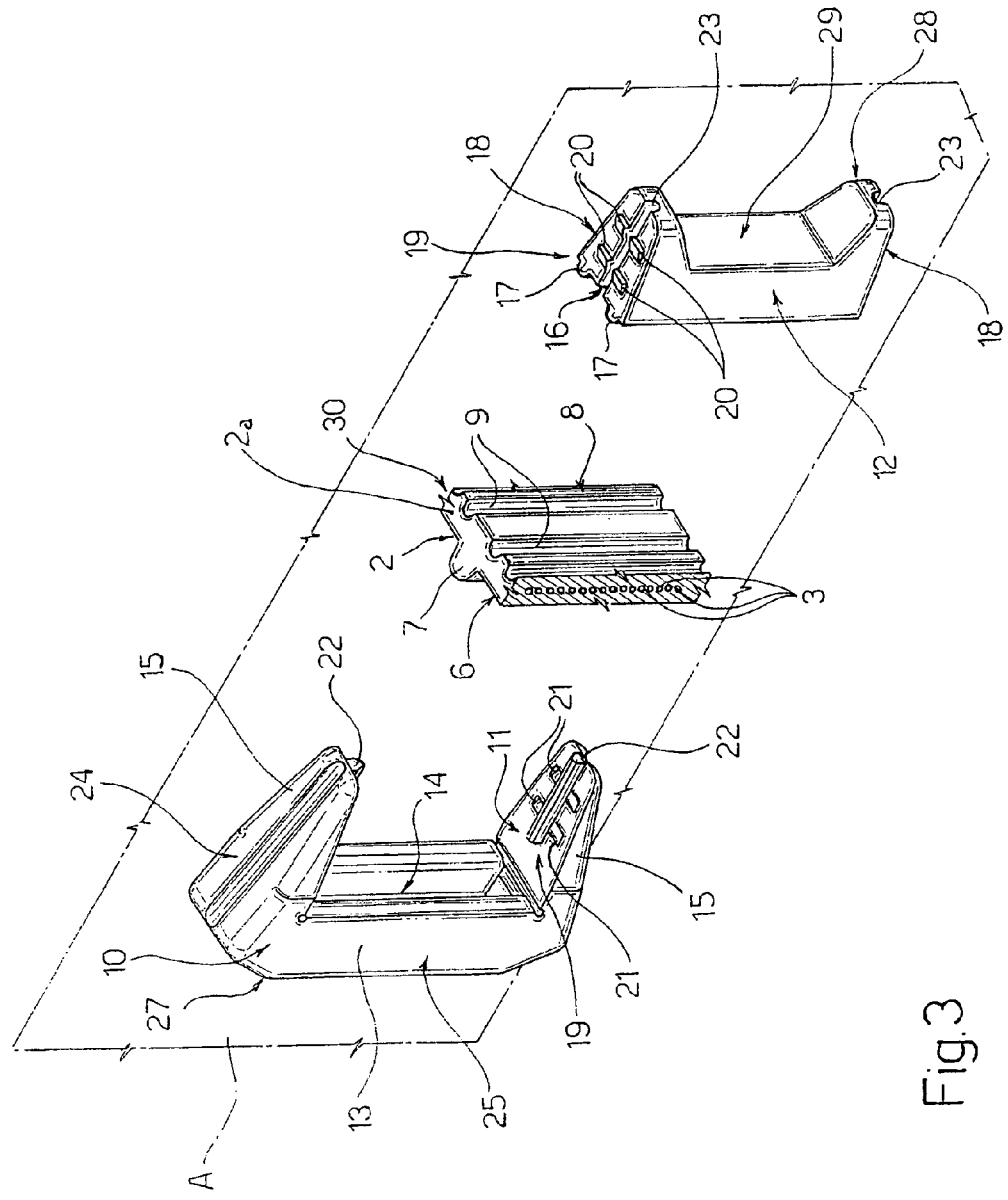
FIG. 3 is an axonometric view showing the assembly of the belt in FIG. 1.

In FIG. 1 it is designated at 1, as a whole, a continuous variable transmission belt comprising a continuous annular band 2 of elastomeric material comprising a body 2a reinforced with an armature of longitudinal filiform members 3 made of polymeric material and a plurality of trapezoidal parallelepiped plugs 4 carried by the continuous band 2 and adapted to cooperate by friction against the friction surfaces of respective pulleys 5 of the transmission.

In particular, the continuous band 2 presents an outer spine 6 comprising integrally a plurality of teeth 7 uniformly spaced apart and transversally facing the filiform members 3, and an inner surface 8 arranged on the opposite side of the outer spine 6 with respect to the filiform members 3 and, in use, facing a rotation axis of the pulley 5. The inner surface 8 defines a plurality of recesses 9 uniformly distributed in pairs along the continuous band 2 so that each tooth 7 is arranged at a median plane of a pair of recesses 9.

Each tooth 7 and the respective pair of recesses 9 cooperate by coupling of shape with a respective plug 4 symmetric with respect to a median plane A transversal with respect to the filiform members 3 and comprising both a C-shaped friction portion 10 defining a cavity 11 and a closing insert 12 housed in the cavity 11 clamping the continuous band 2 against the friction portion 10.

In particular, the friction portion 10 is made of polymeric material and integrally comprises an upper member 13 presenting an indentation 14 open towards the cavity 11 to engage the tooth 7 and a pair of arms 15 extending from the indentation 14 and defining the cavity 11.

The closing insert 12 is made of aluminium and presents an abutting surface 16 coupling with the recesses 9 via a pair of cleats 17 and two side contact walls 18 having a longitudinal dimension comparable to that of the tooth 7 and connected to the arms 15.

The connection is carried out by a snapping quick clutch 19 which presents a plurality of tabs 20 integral with the contact walls 18 and slanted in the opposite direction of the indentation 14 and respective indents 21 facing the contact walls 18 on the arms 15 and cooperating with the tabs 20 to prevent a removal in the parallel direction of the median plane A.

Each arm 15 further comprises a straight guiding rib 22 aligned with the median plane A and engaging a respective groove 23 carried by each contact wall 18 to secure the closing insert 12 along a direction perpendicular to the median plane A.

As a whole, each plug 4 presents a transversal section along the isosceles trapezoidal median plane A laterally defined by friction surfaces 24, and is delimited in perpendicular direction to the median plane A by a pair of abutting surfaces 25 of the upper member 13 and by a pair of converging surfaces 26 defining the arms 15 and the closing insert 12. Radially, the plug 4 is delimited by a head surface 27 perpendicular to the median plane A and by a bottom surface 28 opposite to the respective head surface 27 presenting a central depression 29 carried by the closing insert 12.

In particular, the friction surfaces 24 and the converging surfaces 26 converge on the opposite side of the upper member 13 with respect to the indentation 14 being symmetric with respect to the median plane A. Furthermore, the plugs 4 are longitudinally spaced apart along the continuous band 2 so that the abutting surfaces 25 of two adjacent plugs 4 which traverse a straight section are in contact with each other.

The belt operation is as follows.

During the assembly step, each friction member 10 is engaged by the respective tooth 7, with the continuous band 2 being laterally abutted against the arms 15 within the cavity 11. Subsequently, each friction portion 10 is coupled with the respective closing insert 12 clamping a portion 30 of the continuous band 2 and the connection is ensured by the snapping quick clutch 19 in which the coupling between the grooves 23 and the guiding ribs 22 defines a sliding coupling for inserting the closing insert 12 in the cavity 11.

In particular, the closing insert 12 slides along the guiding ribs 22 until the abutting surface 16 comes into contact against the inner surface 8 of the continuous band 2 and the cleats 17 are coupled with the recesses 9. Having reached this abutted position, the tabs 20 are automatically engaged in the indents 21 creating an obstacle to the release of the closing insert 12 from the cavity 11.

In operation, the friction portions 10 cooperate with the pulleys 5 being integral with the continuous band 2 by coupling of shape with the teeth 7 and the recesses 9.

Along the winding arc around the pulleys 5, the bending of the continuous band 2 is favoured by the recesses 9 and the generated residual heat is disposed effectively by the closing inserts 12, which exchange heat with the atmosphere via the converging surface 26 and the bottom surface 28.

The bottom surface 28 further presents a depression 29 adapted to lighten the belt 1 and increase the ventilating effect.

The advantages of the present invention are as follows.

The closing insert 12 allows the disposal of high amounts of heat because it presents a wide exchange surface with the atmosphere.

The snapping quick clutch 19 allows to assemble rapidly and simply the closing insert 12 on the friction portion 10 via the presence of the guiding ribs 22.

Furthermore, a rigid connection between the plug 4 and the continuous band 2 is ensured by the tabs 20 along a direction parallel to the median plane A of the tabs 20 and along a direction perpendicular to the median plane A by coupling of shape with the teeth 7 and the recesses 9, and the guiding ribs 22 between the closing insert 12 and the friction portion 10.

The presence of the recesses 9 helps the flexibility of the belt 1.

The closing inserts 12 are arranged in contact with the inner surface 8, which is additionally heated by bending, and furthermore during winding on the pulleys 5, the centrifuge force contributes to hold them in pressure against the inner surface 8 itself.

Finally, it is obvious that changes and variations can be implemented to the belt described and illustrated herein without departing from the protection scope of the present invention, as defined by the attached claims.

In particular, it is possible to envisage the application of a layer of adhesive material along the contact walls 18 to further increase the safety of the connection if the applications are particularly demanding.

Furthermore, it is possible to make the closing inserts 12 from a composite polymeric matrix material filled with metallic powders, e.g. using a polyketone PEEK (registered trademark of Victrex USA).

The invention claimed is:

1. A belt for a continuous variable transmission, the belt comprising:
    an annular continuous band comprising a body reinforced by a longitudinal armature and a plurality of friction plugs connected by shape coupling with at least one of either an outer surface of said continuous band or an inner surface opposite said outer surface with respect to said armature,
    said friction plugs comprising respectively a friction member adapted to cooperate with a pulley of said transmission and a connection member cooperating with said friction member to rigidly connect said friction plug to said continuous band,
    each of said connecting members is made of a material whose thermal conductivity is higher than that of said friction members and presents an abutting surface arranged against said inner surface,
    said continuous band comprises:
        a plurality of teeth on said outer surface, said plurality of teeth being housed inside an indentation in said friction member, and
        a plurality of recesses on said inner surface that are shape coupled to respective cleats arranged on said abutting surface.

2. A belt according to claim 1, wherein said connection member and said friction member are connected by a snapping clutch.

3. A belt according to claim 2, wherein said snapping clutch comprises sliding guide means.

4. A belt according to claim 3, wherein said sliding guide means are aligned along a transversal direction with respect to said longitudinal armature.

5. A belt according to claim 1, wherein said friction member presents a section along a transversal plane with respect to said longitudinal armature that is essentially C-Shaped and that defines a cavity housing said continuous band and said closing member.

6. A belt according to claim 1 further comprising at least a first, a second and a third surface in thermal exchange with the atmosphere.

7. A belt according to claim 6, wherein at least one of said first, second and third surfaces presents a depression.

8. A belt according to claim 1, further comprising a layer of adhesive material between said friction member and said connection member.

* * * * *